March 10, 1936.  B. C. JACOB  2,033,715
MATHEMATICAL INSTRUMENT
Filed March 26, 1935  3 Sheets-Sheet 1
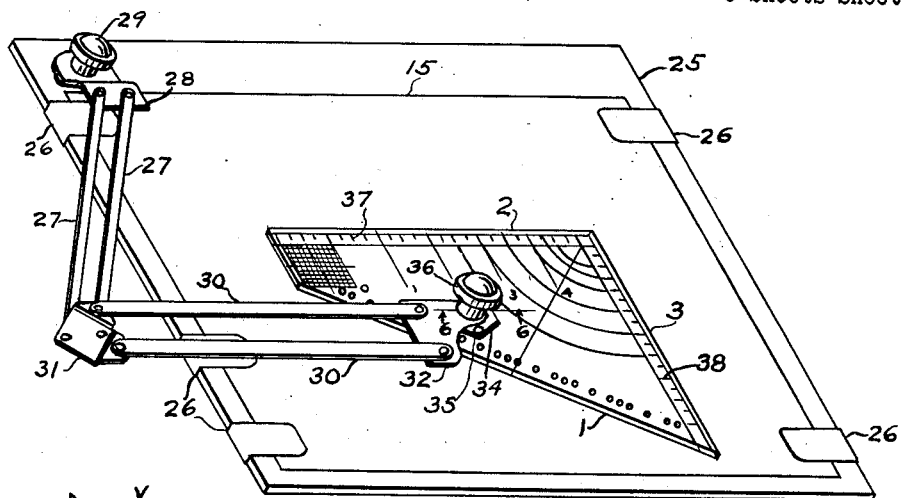
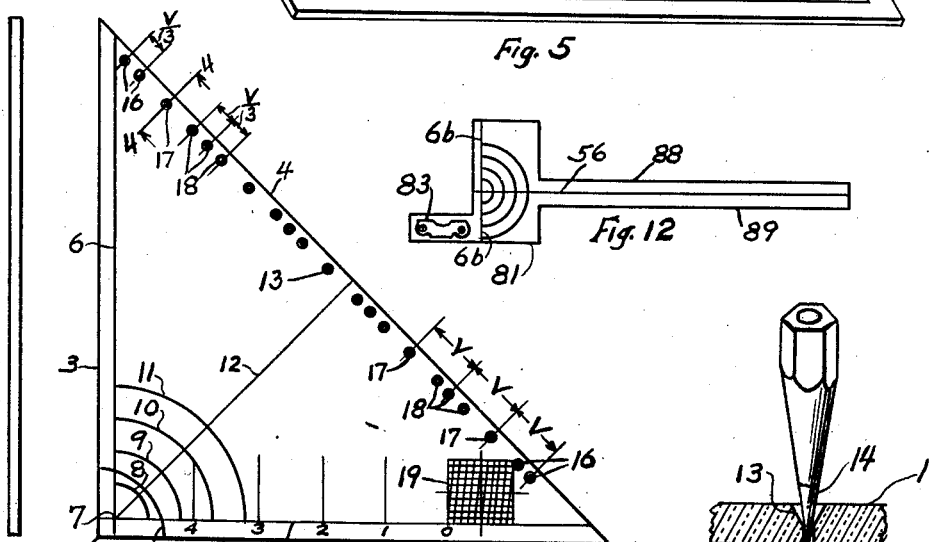
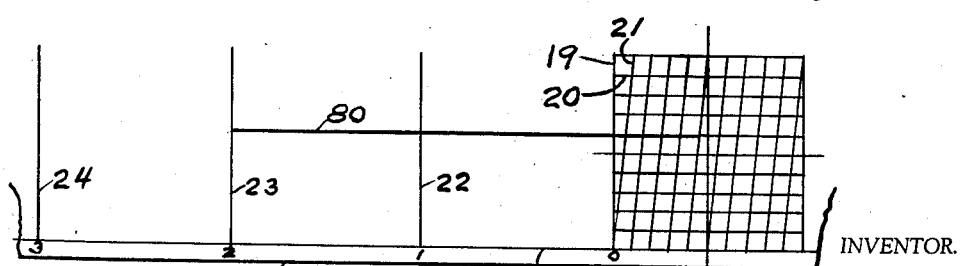
INVENTOR.
Brent C. Jacob
BY Slough and Canfield
ATTORNEY.

March 10, 1936.  B. C. JACOB  2,033,715

MATHEMATICAL INSTRUMENT

Filed March 26, 1935  3 Sheets-Sheet 2

INVENTOR.
Brent C. Jacob
BY
Slough and Canfield
ATTORNEY.

March 10, 1936.    B. C. JACOB    2,033,715
MATHEMATICAL INSTRUMENT
Filed March 26, 1935    3 Sheets-Sheet 3

INVENTOR.
Brent C. Jacob
BY
Sloughand Canfield
ATTORNEY.

Patented Mar. 10, 1936

2,033,715

UNITED STATES PATENT OFFICE 2,033,715

MATHEMATICAL INSTRUMENT

Brent C. Jacob, Cleveland, Ohio

Application March 26, 1935, Serial No. 13,125

6 Claims. (Cl. 33—75)

This invention relates to mathematical instruments.

While the instrument of my invention may be used in the determination of a great variety of mathematical quantities and functions, it is particularly applicable to the solving of problems by the principles of calculus and will be described hereinafter in connection with illustrative uses of this class.

It is therefore an object of this invention to provide an improved mathematical instrument for the solution of various mathematical problems, especially in engineering work.

Another object is to provide a mathematical instrument for applying the principles of calculus to the solution of problems.

Another object is to provide a mathematical instrument by which integrals and differentials may be derived from known functions in an improved manner.

Another object is to provide a mathematical instrument for determining the graphically represented integral of a given graphically represented function, of the graphically represented differential thereof.

Another object is to provide an instrument by which mathematical problems may be solved and which may also be used in performing ordinary drafting operations on a drawing board.

Another object is to provide a mathematical instrument for making mathematical computations which may be used with the so-called "universal" drafting machine.

Other objects will be apparent to those skilled in the art to which my invention appertains.

My invention is fully disclosed in the following description taken in connection with the accompanying drawings, in which:

Figs. 1 and 2 are, respectively, plan view and edge view of one form or embodiment of my invention;

Fig. 3 is a view to an enlarged scale of a part of Fig. 1;

Fig. 4 is a sectional view to an enlarged scale taken on the plane 4—4 of Fig. 1;

Fig. 5 is a perspective view illustrating the embodiment of Fig. 1, in the preferred manner of use in connection with a drawing board and a universal drafting machine;

Figs. 12 and 13 are views similar to Fig. 1 but to a smaller scale and illustrating other forms in which my invention may be embodied.

Figure 13:
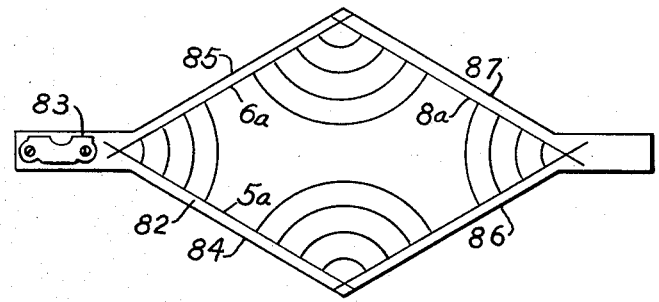

In the following, the physical construction and properties of the combined drafting and mathematical computing instrument embodying my invention will first be described, followed by a description of the method of using the instrument in making an illustrative computation.

Referring to Figs. 1 and 2 which illustrate the preferred embodiment, I have shown at 1 a triangular sheet or piece of transparent material such as pyroxylin plastic, celluloid or the like, such material for example as is commonly used in making drafting triangles, irregular curves, etc. The piece 1 may be of a size convenient to the uses thereof which will appear hereinafter, the piece illustrated in Fig. 1 being approximately one-half of the preferred dimensions. Rectilinear edges 2 and 3 are provided which, in the preferred form illustrated, meet each other at a corner 3a at a right angle. Opposite the corner 3a is a rectilinear edge 4. The edges 2 and 3 may be of equal length although this is not essential. The edges 2, 3, and 4 are made smooth for ruling lines on paper after the manner of ruling lines with the usual triangles.

On one face, the under face or side of the sheet 1 when lying on paper on which it is to be used, in a manner to be described, are inscribed fine lines 5 and 6 parallel respectively to the edges 2 and 3 and meeting at a common point or center 7 in the corner 3a of the piece.

Circular lines 8, 9, 10, and 11, any suitable number of which may be provided, are drawn with the point 7 at the center thereof and preferably extend arcuately to the lines 5 and 6, but may intersect the same if desired, this not being essential. A circle 9a of unit radius and center at corner 3a of the edges 2 and 3 is also provided. A line 12 at an angle of 45° with each of the lines 5 and 6 may also be provided, although not essential, but useful in some computations.

Adjacent to the edge 4 is a row of holes 13 extending through the sheet 1, the holes preferably being counter-bored as shown in Fig. 4 to center the point 14 of a pencil therein whereby the pencil point may accurately mark points on the sheet of paper 15 on which the instrument rests. The holes 13 are disposed in a rectilinear line according to the following grouping. Beginning at the end of the line, is a group of two holes 16—16, then a single hole 17, then a succession of groups of three holes 18 alternating with single holes 17, and a final group at the other end of two holes 16. The single holes 17 are each spaced from the middle hole of the group 18, and from the outer end hole of the groups 16 by equal distances represented in Fig. 1 by the letter V, the other two holes of the group 18 are spaced on each side of the middle hole of the group by a distance V/3; and the holes of the two end groups are spaced apart the distance of V/3, as shown in the drawings.

At the outer end of the line 5 is a rectangle 19 introduced to a larger scale in Fig. 3, divided into equal parts by nine horizontal lines 20 and ten sloping lines 21, the rectangle preferably measuring 1" x 1", and lines 22, 23, and 24 are erected from the line 5, 1" apart, and the line 22, 1" from the rectangle 19. The corner of the rectangle is preferably indicated by an inscribed 0 and the lines 22 to 24 by inscribed numerals 1, 2, 3, etc.

Figure 6:
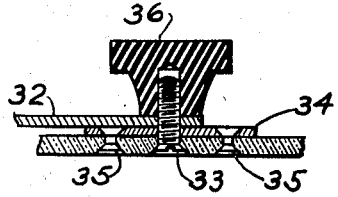
Fig. 6 is a sectional view to an enlarged scale taken from the plane 6—6 of Fig. 5.

In the use of the instrument, it is laid on drawing paper on a drawing board and may be moved thereover by sliding one edge, for example the edges 2 or 3, along another straight edge such as the edge of a triangle; but in the preferred practice of my invention, the instrument of Fig. 1 is mounted on a universal drafting machine as shown in Fig. 5. A drawing board 25, provided with suitable clip devices 26—26 for mounting a sheet of paper 15 thereon, has the primary parallel arms 27—27 of the drawing machine mounted on a base 28 secured to the board 25 by any suitable construction, for example by a thumb screw 29. The secondary arms 30—30 of the machine, pivoted to the elbow 31 at one end to which the free ends of the arms 27—27 are pivoted, carry on their free ends a plate 32 (see also Fig. 6). A screw 33 is projected upwardly through the material of the instrument, 1, and through a plate 34 preferably riveted to the instrument 1 by rivets 35—35 and through the plate 32. A thumb screw or knob 36 on the screw 33 is provided to clamp the plates 32 and 34 together.

By this means, when the knob 36 is loosened, the instrument 1 may be rotated around the screw to any desired position; then when the knob 36 is tightened, the instrument 1 will move bodily with the arms 30—30 of the instrument in the well known manner to move the instrument about over the paper whereby parallel lines may be drawn by the edge 2 or the edge 3. As shown in Fig. 5 but not in Fig. 1, the instrument may have, along the edges 2 and 3, scales 37 and 38.

The instrument is preferably designed to measure lengths in some unit, such as inches or centimeters and areas in unit such as square inches or square centimeters. When the unit is to be an inch, and when the lines 0, 1, 2, and 3, described above in connection with Figs. 1 and 3, are 1" apart, the scales 37 and 38 may be suitably inch scales and the circles 8 to 11 may be conveniently to ½", 1", 1½" and 2" radii.

The method of using the instrument above described to determine the graphically represented integral of a graphically represented function will now be described as an illustrative use thereof.

Figure 7:
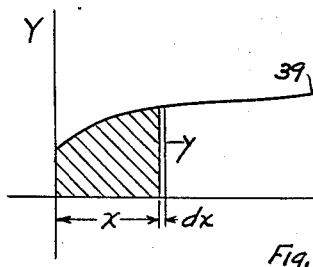
Fig. 7 is a view illustrating graphically, to the conventional X and Y coordinates, a function to be integrated as an illustrative use of the mathematical instrument of my invention.

The curve 39 of Fig. 7 represents, graphically, some function of $x$ and $y$, which function may in fact be impossible of algebraic expression, and unknown, except graphically. Suppose it be desired to ascertain the area represented by the curve 39, namely the area between the curve and the base coordinate X.

Figure 8:
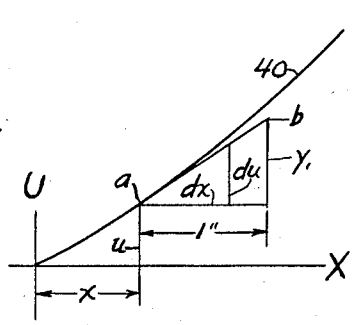
Fig. 8 is a view illustrating a step of theory underlying the practice of my invention.

We will first assume that the curve 40 of Fig. 8 is the integral of the curve 39. Then for any value of $x$, the ordinate $u$, having the value of $y.dx$ integrated from zero to $x$, is a measure of the shaded area under the curve 39 from zero to $x$.

A tangent $ab$ may now be drawn to the curve 40 at the point $a$ at the top of the ordinate $u$, and the slope thereof will be $du/dx$. If a unitary base such as 1" be substituted for $dx$, then the slope of the tangent $ab$ will be $yl/l$, or, $yl$. That is to say, $yl = du/dx$. In the equation $yl = du/dx$, we can substitute for $du$ the quantity $y.dx$, hence $y$ and $yl$ are equal. Thus, we find that the slope of the integral curve 40 at any point $a$ may be represented by $y/l$ or $y$ where $l$ is the unitary length chosen as above described. The integral curve 40 was arbitrarily chosen for purposes of analysis, but the actual integral curve may now be found by finding a succession of points $a$ at successive values of $x$, defining a curve, the slope of which at each point $a$, or at each value of $x$, may be represented by $y$, $y$ being taken from curve 39 for the corresponding value of $x$.

Figure 9:
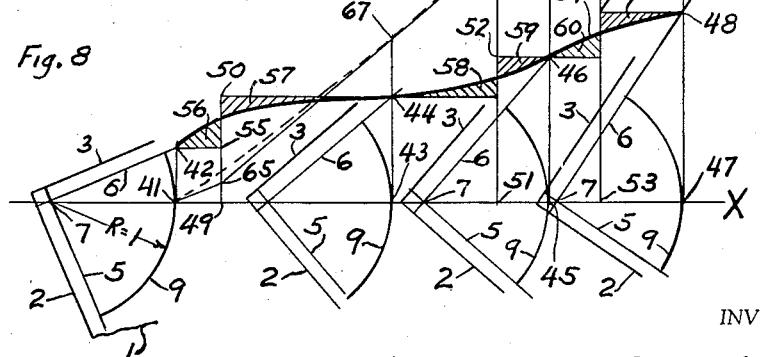
Fig. 9 is a view illustrating the method of using the instrument of my invention in determining the graphically represented integral of the curve of Fig. 7.

To use the above described instrument to find such an integral curve, the following process is followed, with reference to Fig. 9. The given curve 39 is reproduced from Fig. 7. A number of primary ordinates 41—42, 43—44, 45—46, and 47—48, are drawn to the base X, the ordinates 41—42 and 47—48 being end ordinates. Secondary ordinates 49—50, 51—52, and 53—54 are drawn between successive pairs of the primary ordinates. The ordinate 49—50 is so chosen that when horizontal lines 42—55 and 50—44 are drawn, the shaded area 56 below the curve will be equal to the shaded area 57 above the curve. The areas 56 and 57 may be made equal by inspection and this is facilitated if the curve is drawn on cross-section paper. In a similar way, the secondary ordinate 51—52 is chosen so that the areas 58 and 59 will be equal, and the secondary ordinate 53—54 is so chosen that the areas 60 and 61 will be equal.

The instrument 1 above described is now laid on the drawing, Fig. 9, with the center 7 on the X axis extended to the left, and with the circle 9 of unitary radius, tangent to the ordinate 41—42 at the X axis. The instrument is then rotated around the center 7, keeping the circle tangent as described, until the line 6 intersects the top 42 of the first ordinate. An angle of slope for the line 6 is thus determined. A straight edge is then placed along the edge 2 of the instrument 1 to guide it (or in the preferred form illustrated in Fig. 5, the knob 35 is turned to fix the instrument in the determined position) and the edge 3 of the instrument is then moved, parallel to itself, until it intersects the point 41 and the line 41—65 is drawn at the predetermined slope from the point 41 to the ordinate 49—50.

The instrument is then again set up with the center 7 on the line X and with the curve 9 tangent to the ordinate 43—44, and is rocked until the line 6 intersects the point 44. Then the instrument is moved bodily until the edge 3 intersects the point 65 and a line is drawn along the edge, from the point 65 to ordinate 51—52 extended, at 62.

The instrument is again set up with the circle 9 tangent to the ordinate 45—46, and the instrument is rocked until the line 6 intersects the point 46, and then the edge 3 is moved bodily until it intersects the point 62 and a line is drawn from the point 62 to the ordinate 53—54 extended, as at 63.

The instrument is finally set up with the circle 9 tangent to the ordinate 47—48 and rocked until the line 6 intersects the point 48 and then the edge 3 is moved to draw a line from the point 63 to the ordinate 47—48 extended, as at 64.

The broken line curve 66 which now may be drawn tangent to the line 41—65—62—63—64 at points 41, 67, 68, and 69, is the desired integral curve. That the curve 66 is the desired integral curve, i. e. has ordinates that are measures of the area under the given curve 39 at all values of $x$, the following proof is offered, with reference to Fig. 10 where the curves of Fig. 9 have been reproduced.

By similar triangles, 49—65:41—49: :41—42:R. From this 49—65×R=41—49×41—42, which is the area of the rectangle 41—42—55—49. Likewise, 69—67×R=69—65×43—44, which is the area of the rectangle 49—50—44—43.

Now, rectangle 41—42—55—49 is the area under the curve 39 minus the shaded area 56. Similarly, the rectangle 49—50—44—43 is the area under the curve 39 plus the shaded area 57. Therefore, the sum of these two rectangles equals the area under the curve 39 and therefore the height 49—65 plus the height 69—67 or 43—67 ×R equals the area under the curve 39 from 41 to 43, R being unity or in this case 1. Thus, the height 43—67 is a measure of the area under the curve 39 from 41 to 43.

In a similar manner, the ordinate 45—68 is found to be a measure of the area under the curve 39 from 41 to 45; and the ordinate 47—64 is found to be a measure of the entire area from 41 to 47.

In carrying out the above described method, if the ordinates to the curve 39 are drawn closer together, the approximate segmental integral curve will closely approximate a continuous curve closely enough so that the curve 66 will not have to be drawn. Furthermore, if the curve to be integrated is drawn on cross-section paper, it will not be necessary to estimate the position of the secondary ordinates by estimating equal areas above and below the curve, but instead these secondary ordinates may be taken as average ordinates between the primary ordinates to give the desired degree of accuracy.

Figure 10:
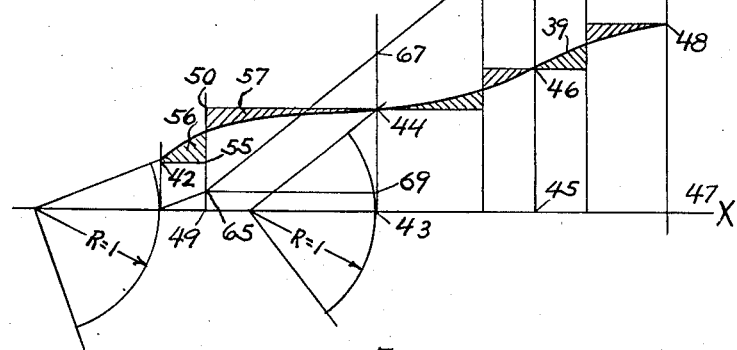
Fig. 10 is a veiw illustrating a proof of the method of Fig. 9.

As an alternative method step, instead of selecting ordinates as above described to give areas such as 56 and 57 below and above the curve 39, ordinates may be determined from Simpson's rule for area, which is: $A = V/3 \ (h_0 + 4h_1 + 2h_2 + 4h_3 + 2h_4 + \ldots h_n)$, where $n$ is an even number of equal spaces having the width V, with end ordinates $h_0$ and $h_n$. To apply this principle, the instrument 1 (see Fig. 11 wherein a part of the instrument 1 is illustrated to enlarged scale) is rotated around with respect to the given curve 39 so that the outer hole of the group 16, namely the hole 70, coincides at its center with the end ordinate, 41—42 of the curve, extended downwardly; and so that the center hole of one of the groups 18, such for example as the hole 71, coincides with the other end ordinate, 47—48 of the curve, extended. With the instrument in this position, the pencil as shown in Fig. 4 may be inserted into all of the holes between the holes 70 and 71, making points on the paper and then the instrument may be removed and parallel ordinates drawn through these points. Points are thereby determined on the curve 39 by lines drawn through the holes 17 of the one-hole groups, for example the point 74; and horizontal lines drawn through the curve at these points of intersection therewith will determine a plurality of rectangles as shown in Fig. 10 which may then be drawn. These rectangles while clarifying this explanation, need not be actually drawn in practice.

Figure 11:
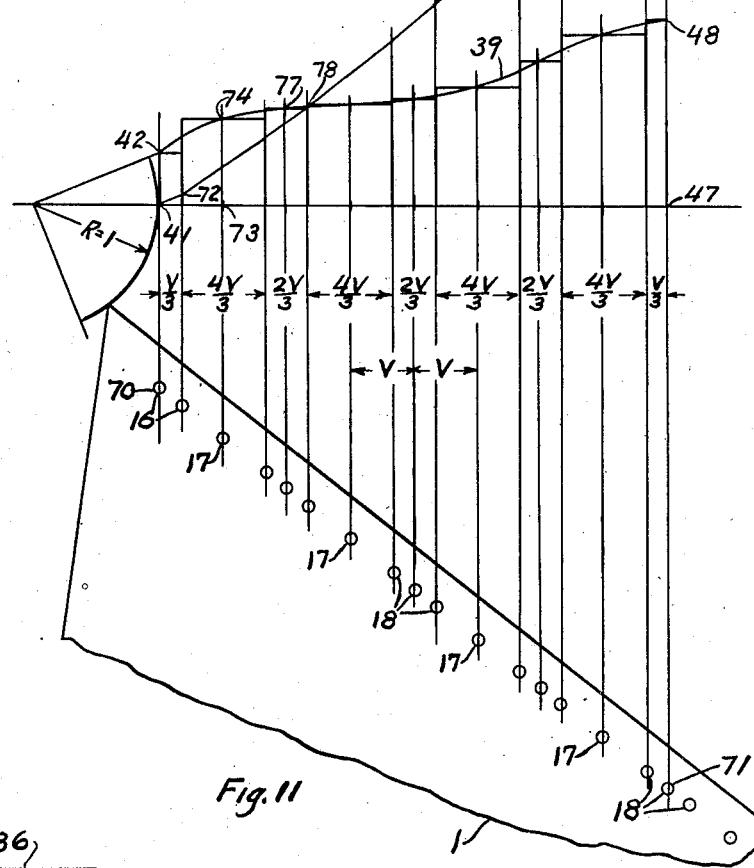
Fig. 11 is a view illustrating another use of the instrument in determining the said integral.

It will be observed that the width of these rectangles will, in succession, have the relation V/3, 4V/3, 2V/3, 4V/3 ... V/3, which is the relationship called for by Simpson's rule, this resulting from the above-described spacing of the holes in the instrument, the horizontal distance from each single hole 17 to the middle hole of the group 18 being of the value V, all as shown in Fig. 11.

By the method described in detail in connection with Fig. 9, using a unitary radius R=1, a slope is now found to the top of the first ordinate 41—42 and the first section of the integral curve 41—72 is drawn. A slope is then found to the top of the ordinate 73—74 and with this slope the next section of the integral line is drawn from 72 to 75. A slope is then found to the top of the ordinate 76—77 to which slope the next section of the integral line is drawn, from 75 to 78. This process is continued to complete the integral line indicated generally at 79.

For convenience in accurately measuring the lengths of lines, or distances along a line between chosen points, I have provided the rectangle 19 and associated lines above referred to in connection with Fig. 3. For example, to measure the length of the line 80, Fig. 3, the instrument is placed over the line with one end of the line (which by inspection is seen to be between 2 and 3" long) on the 2" vertical line 23 and parallel to the line 5, and the instrument is moved keeping the line 80 parallel to the line 5 and with the end of the line 80 on the line 23 until the other end of the line coincides with one of the diagonals 21. The fractional length of the line is read in decimals, as follows:

Counting from the zero point, the end of the line lies on the fourth diagonal of the group 21, so that the first number to the right of the decimal point will be 4; and the end of the line also lies on the sixth parallel or horizontal line of the group 20 and therefore the second decimal figure is 6 and the length of the line 80 therefore is 2.46".

In the foregoing I have described one illustrative use of the instrument, namely in determining integrals. It will be obvious that differentials may be obtained in the reverse order, using circle 9a, whose center is on the corner 3a, to mark along edge 2 or 3. A very great variety of different kinds of problems, arithmetical, algebraic, geometrical and involving calculus, may be solved; but it is deemed unnecessary to expand this application to describe all of them.

While as stated above the instrument may be moved along an edge to position the inscribed lines thereon, such as the edge of a triangle or straight edge, the preferred form is that illustrated in Fig. 5 where the instrument is made as an integral part of a drafting machine of the "universal" or double-parallelogram-movement type. Other forms are shown in Figs. 12 and 13 wherein the sheet of transparent material 81 or 82 has secured thereto an attaching device 83 of well known form by which the instrument may be attached to the conventional form and construction of "universal" drafting machine.

While the lines 5 and 6 meeting at the point 7 are drawn at a right angle to each other in the form of Fig. 1 above described, this is not essential. These lines may be at an acute angle to each other as shown at 5a and 6a in Fig. 13, or at at obtuse angle to each other as shown at 5a, 7a, or 6a, 8a in Fig. 13. And the edges 84 and 85 and 86 and 87, being parallel to the lines 5a, 6a and 7a, 8a, may be used in connection with these lines as the edges 2 and 3 are used in connection with the lines 5 and 6 of the described form.

In the form of Fig. 12, a line 5b may be used with either of two lines, 6b, and parallel edges 88 and 89 are provided to transfer the slope of the line 5b.

Thus my invention may be embodied in an almost infinite number of shapes which need not be illustrated here.

Preferably, the engraved lines are, as above referred to, on the under side of the instrument and may be colored black, red or other contrasting color to render their use more accurate. Several circles, such as 8 to 11, in the form of Fig. 1, and corresponding circles in the other illustrated forms, are provided, either of which may be taken as having the radius of unitary length above described, and are convenient where it is desired to work with curves or other quantities of different dimensional scale.

As will now be apparent, my invention is not limited to the exact details of construction shown and described and many modifications other than those illustrated and described may be made within the spirit of my invention without sacrificing its advantages and within the scope of the appended claims.

I claim:

1. A mathematical instrument comprising a sheet-like element of transparent material having a rectilinear line ruling edge, an inscribed rectilinear line parallel to the ruling edge, a circular arc having its center in said inscribed rectilinear line, and a row of pencil-point centering perforations in rectilinearly spaced groups, alternate groups comprising a single perforation and three perforations respectively, the single perforations being equally spaced from the middle perforations of the three perforation groups, and the other two perforations of the three perforation groups being spaced from the middle perforations on each side thereof by an amount equal to one-third of the said single perforation to middle perforation spacing.

2. A mathematical instrument comprising a sheet-like element, supporting means connected to the element comprising a pivot upon which the element may be rotated and comprising means to lock the element against rotation in any rotated position, and means to support the supporting means and permitting universal parallel bodily movement of the supporting means and locked element, and the sheet-like element having a row of pencil-point centering perforations extending therethrough in rectilinearly spaced groups, alternate groups comprising a single perforation and three perforations respectively, the single perforations being equally spaced from the middle perforations of the three perforation groups, and the other two perforations of the three perforation groups being spaced from the middle perforations on each side thereof by an amount equal to one-third of the said single perforation to middle perforation spacing.

3. A mathematical instrument for determining a graphic differential function from an integral function graphically represented by a curve drawn to a base line and with a plurality of ordinates intersecting the curve, the instrument comprising a sheet of transparent material having a rectilinear ruling edge, a circular arc, an arc center and a rectilinear line engraved on the sheet, the line being in a direction radial to the arc and parallel to the ruling edge and having a portion extending outwardly beyond the arc for a distance equal to at least the arc radius, the instrument adapted to be laid over the integral curve in successive positions with the arc center on the base line and the arc tangent to successive ordinates whereby in each position the instrument may be rotated about the center to cause the rectilinear line to coincide with the point of intersection of the ordinate with the integral curve, to determine a succession of slopes for the ruling edge.

4. A mathematical instrument for determining a graphic differential function from an integral function graphically represented by a curve drawn to a base line and with a plurality of ordinates intersecting the curve, the instrument comprising a sheet of transparent material having a rectilinear ruling edge, a circular arc, an arc center and a rectilinear line engraved on the sheet, the line being in a direction radial to the arc and parallel to the ruling edge and having a portion extending outwardly beyond the arc for a distance equal to at least the arc radius, the instrument adapted to be laid over the integral curve in successive positions with the arc center on the base line and the arc tangent to successive ordinates whereby in each position the instrument may be rotated about the center to cause the rectilinear line to coincide with the point of intersection of the ordinates with the integral curve, to determine a succession of slopes for the ruling edge, and a second edge on the sheet for engagement with a straight edged guide along which the element may be bodily moved to move the ruling edge to successive parallel positions.

5. A mathematical instrument for determining a graphic differential function from an integral function graphically represented by a curve drawn to a base line and with a plurality of ordinates intersecting the curve, the instrument comprising a sheet of transparent material having a rectilinear ruling edge, a circular arc, an arc center and a rectilinear line engraved on the sheet, the line being in a direction radial to the arc and parallel to the ruling edge and having a portion extending outwardly beyond the arc for a distance equal to at least the arc radius, the instrument adapted to be laid over the integral curve in successive positions with the arc center on the base line and the arc tangent to successive ordinates whereby in each position the instrument may be rotated about the center to cause the rectilinear line to coincide with the point of intersection of the ordinates with the integral curve, to determine a succession of slopes for the ruling edge, and a second edge on the sheet for engagement with a straight edged guide along which the element may be bodily moved to move the ruling edge to successive parallel positions, and supporting means connected to the sheet comprising a pivot upon which the sheet may be rotated and comprising means to lock the sheet against rotation in any rotated position and means to support the supporting means and permitting universal parallel bodily movement of the supporting means and locked element.

6. A mathematical instrument comprising a sheet like element, and a row of pencil-point centering perforations in rectilinearly spaced groups, alternate groups comprising a single perforation and three perforations respectively, the single perforations being equally spaced from the middle perforations of the three perforation groups, and the other two perforations of the three perforation groups being spaced from the middle perforations on each side thereof by an amount equal to one-third of the said single perforation to middle perforation spacing.

BRENT C. JACOB.